(12) United States Patent
Kraus et al.

(10) Patent No.: US 8,047,561 B2
(45) Date of Patent: Nov. 1, 2011

(54) AIRBAG COVER

(75) Inventors: Günter Kraus, Goldbach (DE); Wolfgang Guretzki, Großostheim (DE); Stefan Bahmer, Großwallstadt (DE)

(73) Assignee: Takata-Petri AG, Aschaffenburg (DE)

( * ) Notice: Subject to any disclaimer, the term of this patent is extended or adjusted under 35 U.S.C. 154(b) by 50 days.

(21) Appl. No.: 12/379,439

(22) Filed: Feb. 20, 2009

(65) Prior Publication Data
US 2009/0218793 A1 Sep. 3, 2009

Related U.S. Application Data

(63) Continuation of application No. PCT/EP2007/057992, filed on Aug. 2, 2007.

(30) Foreign Application Priority Data

Aug. 23, 2006 (DE) .................... 20 2006 013 133 U

(51) Int. Cl.
*B60R 21/16* (2006.01)
(52) U.S. Cl. ................... 280/728.2; 280/728.3; 280/731
(58) Field of Classification Search ............... 280/728.1, 280/728.2, 728.3, 731
See application file for complete search history.

(56) References Cited

U.S. PATENT DOCUMENTS

| 5,395,668 | A | 3/1995 | Ito et al. |
| 5,584,503 | A | 12/1996 | Lutz |
| 5,741,025 | A | 4/1998 | Meyer et al. |
| 5,957,483 | A | 9/1999 | Miltenberger et al. |
| 6,419,261 | B1 * | 7/2002 | Ibe .............................. 280/728.2 |
| 6,431,582 | B1 * | 8/2002 | Ennis et al. .................. 280/728.2 |
| 6,505,850 | B2 | 1/2003 | Helfrich et al. |
| 6,612,607 | B1 * | 9/2003 | Takahashi .................... 280/728.3 |
| 6,752,415 | B2 * | 6/2004 | Nelson et al. ............... 280/728.2 |
| 6,951,349 | B2 * | 10/2005 | Yokota et al. ............... 280/728.2 |
| 7,004,497 | B2 * | 2/2006 | Thomas et al. ............. 280/728.3 |
| 7,255,364 | B2 * | 8/2007 | Bonam et al. ................. 280/731 |
| 7,393,003 | B2 * | 7/2008 | Meson ........................ 280/728.2 |

(Continued)

FOREIGN PATENT DOCUMENTS

DE 44 09 405 A1 9/1994

(Continued)

OTHER PUBLICATIONS

Examination Report mailed Jan. 28, 2010 in Russian Application No. 2009108841/11(011845).

(Continued)

*Primary Examiner* — Toan To
(74) *Attorney, Agent, or Firm* — Foley & Lardner LLP

(57) ABSTRACT

A cover for an inflatable airbag that is configured to restrain a vehicle occupant in a motor vehicle. The airbag cover is arranged to cover the airbag on a side facing a vehicle interior. The airbag has an opening region configured to form an orifice during deployment of the airbag so that the airbag is deployed through the orifice of the airbag cover and into the vehicle interior. The airbag cover includes a first portion and a second portion. The first portion includes a more dimensionally stable material than the second portion. The second portion includes the opening region, which is configured to tear open and form the orifice for the airbag during deployment. The first portion includes the orifice, which is delimited by a sidewall and is covered by the opening region of the second portion. The sidewall is configured to guide the deploying airbag to the opening region.

17 Claims, 3 Drawing Sheets

U.S. PATENT DOCUMENTS

| | | | |
|---|---|---|---|
| 7,651,124 B2 * | 1/2010 | Gulde | 280/731 |
| 2003/0067143 A1 * | 4/2003 | Nelson et al. | 280/728.2 |
| 2003/0132621 A1 | 7/2003 | Arieth et al. | |
| 2003/0184063 A1 | 10/2003 | Yasuda et al. | |
| 2004/0084881 A1 | 5/2004 | Helmstetter | |
| 2004/0262889 A1 * | 12/2004 | Roychoudhury | 280/728.2 |

FOREIGN PATENT DOCUMENTS

| | | |
|---|---|---|
| DE | 44 29 214 A1 | 2/1996 |
| DE | 197 18 931 C1 | 8/1998 |
| DE | 200 23 347 U1 | 10/2003 |
| DE | 103 52 565 A1 | 6/2005 |
| DE | 20 2005 007 002 U1 | 8/2005 |
| EP | 0 808 750 B1 | 11/1997 |
| EP | 0 849 128 A1 | 6/1998 |
| EP | 1 106 445 A1 | 6/2001 |
| JP | 5170044 A | 7/1993 |
| JP | 09123856 A | 5/1997 |
| WO | WO-01/42060 A1 | 6/2001 |
| WO | WO 2005/092674 A1 | 10/2005 |

OTHER PUBLICATIONS

Chinese Office Action dated Jul. 1, 2010 for Chinese Application No. 200780031312.7 with English translation(12 pgs).

* cited by examiner (A-A)

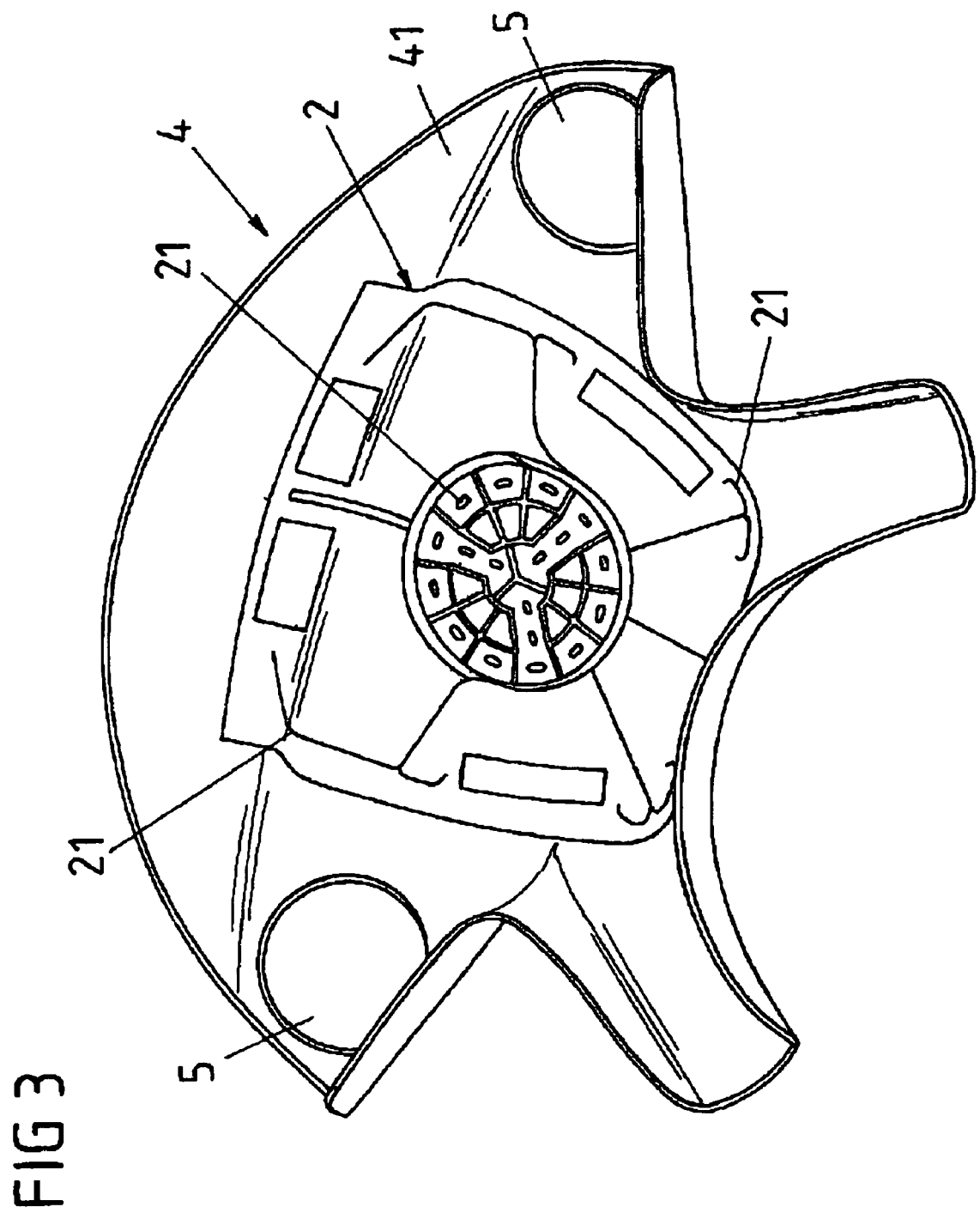

AIRBAG COVER

CROSS-REFERENCE TO RELATED PATENT APPLICATIONS

This application is a Continuation of International Patent Application No. PCT/EP2007/057992, filed Aug. 2, 2007, which was published in German as WO 2008/022889 and is incorporated herein by reference in its entirety.

BACKGROUND

The disclosure relates to an airbag cover for covering an inflatable airbag for the restraint of a vehicle occupant in a motor vehicle.

Airbag covers in the form of airbag caps for covering a vehicle airbag of a vehicle occupant restraint system are known, for example, for driver airbags. Conventional airbag caps of this type are mounted on the steering wheel of a vehicle such that an airbag arranged in a steering wheel is covered toward the vehicle interior side. The airbag cap has a region that opens (e.g., tears open) due to the pressure of the deploying airbag so that the inflated airbag can extend through the orifice of the airbag cap and deployed into the vehicle interior if triggered.

Airbag caps must tear open or swing open reliably and quickly when triggered and must be dimensionally stable to ensure a permanent connection with the steering wheel or with other vehicle parts. For this purpose, fastening structures are conventionally formed on the airbag cap, for example to allow a latching or riveting of the airbag cap, and to make it possible to fasten attachments, for example switches or other operating elements. Particularly for screwing attachments, threaded inserts or additional insert parts are conventionally provided in the airbag cap to ensure a reliable connection of the attachments to the airbag cap.

SUMMARY

One disclosed embodiment relates to an airbag cover for an inflatable airbag that is configured to restrain a vehicle occupant in a motor vehicle. The airbag cover is arranged to cover the airbag on a side facing a vehicle interior. The airbag has an opening region configured to form an orifice during deployment of the airbag so that the airbag is deployed through the orifice of the airbag cover and into the vehicle interior. The airbag cover includes a first portion and a second portion. The first portion includes a more dimensionally stable material than the second portion. The second portion includes the opening region, which is configured to tear open and form the orifice for the airbag during deployment. The first portion includes the orifice. The orifice is delimited by a sidewall and is covered by the opening region of the second portion. The sidewall is configured to guide the deploying airbag to the opening region.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is a perspective view of a second portion of an airbag cover according to an exemplary embodiment.

DETAILED DESCRIPTION

Figure 1A:
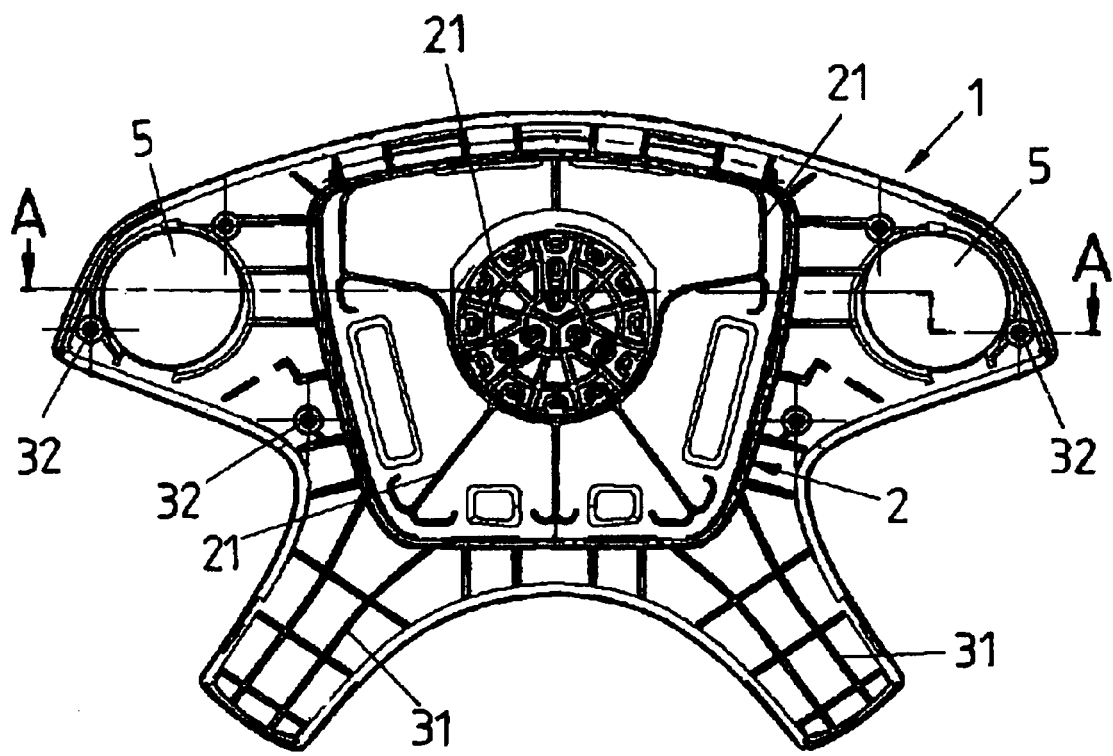
FIG. 1A illustrates an airbag cover for covering an airbag according to an exemplary embodiment.

According to various exemplary embodiments, an airbag cover can be produced more simply and more cost effectively compared with conventional airbag covers.

According to various exemplary embodiments, an airbag cover for covering an inflatable airbag is configured for the restraint of a vehicle occupant in a motor vehicle. The airbag cover may be arranged in the vehicle with respect to the airbag so that it covers the airbag toward the vehicle interior and has an opening region that releases an orifice under the action of the deploying airbag. The airbag then can be deployed through the orifice of the airbag cover into the vehicle interior when triggered. The airbag cover includes two parts or portions, of which a first portion may be composed of a more dimensionally stable material than a second portion comprising the opening region and in which the orifice for the airbag is formed during deployment.

The opening of the airbag cover for the deploying airbag may be taken over by the opening region formed in the less dimensionally stable (e.g., softer) portion of the airbag cover. The opening region can be implemented more simply in a less dimensionally stable portion. For example, because of directed material weakenings, tear open lines can be made more easily. The opening region can be produced more cost effectively in a softer material than in a dimensionally stable material.

In a preferred exemplary embodiment, the first and more dimensionally stable portion of the airbag cover may have fastening structures that make it possible to fasten the airbag cover to a vehicle portion. The fastening structures may be, for example, fastening structures for a latch, screw, or rivet connection. According to an exemplary embodiment, the more dimensionally stable portion of the airbag cover assumes the connecting function while the swing open function for allowing through-passage of a deploying airbag is assigned to the less dimensionally stable portion. A connection of the airbag cover to a vehicle portion can be implemented more reliably via a dimensionally stable portion than in a less dimensionally stable portion. The implementation of a tear open region may be simpler in a less dimensionally stable portion than in a dimensionally stable portion.

According to an exemplary embodiment, the airbag cover can be produced in a simple way and nevertheless fulfill the diverse and sometimes contradictory requirements of an airbag cover. In particular, the less dimensionally stable material for the second portion of the airbag cover may be selected to tear open within a wide temperature range of about −35° C. to about 85° C.

According to an exemplary embodiment, a connection (e.g., a permanent connection) of the airbag cover to a vehicle part may be made via the first and more dimensionally stable portion. Depending on the configuration of the first portion additional attachments (e.g., switches) can be fastened to the first portion in a simple way, for example self tapping plastic screws may be used. A screw connection can be implemented in a simple way to increase the likelihood of being able to rescrew the airbag cover to the vehicle part in the event of repair.

Because the connection of the airbag cover to a vehicle or of attachments to the airbag cover takes place directly via the more dimensionally stable portion of the airbag cover, it may not be necessary to introduce additional threaded inserts, insert parts, or other aids into the airbag cover to make a stable connection. The fastening structures may be formed at the same time in the first and more dimensionally stable portion of the airbag cover to considerably reduce the manufacturing outlay and costs.

The direct formation of fastening structures on the airbag cover (via the more dimensionally stable portion) may also solve a problem in which threaded inserts subsequently introduced into an airbag cap do not have sufficient peel strength with respect to the material of the airbag cap. According to exemplary embodiment, the fastening structures may be formed directly or screws may be screwed directly into the more dimensionally stable material of the first portion.

A further advantage of the airbag cover according to various exemplary embodiments is that lifting forces can be transmitted via the more dimensionally stable portion without experiencing elastic deformation. The airbag cover according may remain dimensionally stable over its useful life.

The airbag cover may be fastened to a vehicle part, for example a portion of an airbag module of an occupant restraint system. For a driver airbag, the airbag cover may be mounted on a component of the steering wheel of the vehicle. However according to various exemplary embodiments, the airbag cover is not restricted to driver airbags and may also be used for covering other airbags of an occupant restraint device.

According to a preferred exemplary embodiment, the first and second portions may be designed to correspond to one another and may be arranged with respect to one another so that after the mounting of the airbag cover in a vehicle the first portion faces away from the vehicle interior and the second portion faces the vehicle interior.

For purposes of this disclosure, the term "correspond" may mean that the contour of the first and second portions is at least similar or even approximately identical so that the two portions cover one another in the airbag cover. Corresponding structures may also be provided on the two portions (e.g., orifices) and cooperate in the airbag cover. The structures may be designed in the two portions with a nearly identical shape and arranged in positions with the contour of the respective portion so that one lies above the other in the airbag cover.

Preferably, the first portion has a passage delimited by a sidewall and through which the airbag can be deployed in the direction of the opening region of the second portion. The first portion may have rib structures that run approximately transverse to the sidewall and stabilize the sidewall of the passage.

In a preferred exemplary embodiment of the airbag cover, one side of the second portion may form an outside surface of the airbag cover that points faces the vehicle interior after the airbag cover is mounted. Preferably, a closed marginal portion of the second portion surrounding the opening region is connected on a side facing away from the outside to a closed surface portion of the first portion surrounding the passage. The marginal region of the second portion may have a generally flat profile and may be integrally formed with the first portion. The second portion may be adapted to the surface of the first portion because of the softer formation of its shape.

The second and less dimensionally stable portion may be formed from a soft or flexible material, while the first and more dimensionally stable portion may be formed from a hard material. According to an exemplary embodiment, both the soft and the hard portion of the airbag cover may be formed from a plastic material. Advantageously, the plastic material for the first portion may be from the same family of plastic materials as the plastic material for the second portion. Using the same family of plastic materials may affords advantages in terms of the peel strength of the two materials with respect to one another. Moreover, the airbag cover may be more recycling friendly because two similar plastic materials are used.

According to an exemplary embodiment, a 2 C (two component) injection molding method may be used for the production of the airbag cover formed from plastic materials. The more dimensionally stable first portion may be produced from a hard plastic (e.g., Dym 1300) and the second portion is produced from a soft component (e.g., formed from the plastic Dym 250S). In 2 C injection molding, two different plastic components (e.g., a hard and a soft component) are injected in succession into an injection molding die to form an injection molding of two components connected to one another in a materially integral manner. Therefore, a materially integral connection of the two portions of the airbag cover can be produced using the 2 C injection molding method. In the softer portion, a special surface feel can be introduced (e.g., directly introduced) during its production using 2 C injection molding.

According to an exemplary embodiment, the airbag cover can be used in an airbag module for a vehicle occupant restraint system. The occupant restraint system may be a driver airbag module that can be arranged, for example, in the steering wheel of the vehicle. A steering wheel having such an airbag module generally also includes a gas generator for inflating the airbag. The cover forms an airbag cover for the airbag and, for example, may close off the middle region of the steering wheel toward the vehicle occupant space. Attachments (e.g., switches for a horn or other operating elements) can be connected to the steering wheel via the airbag cover and be coupled to other devices of the steering wheel.

FIG. 1A shows an airbag cap or cover 1 that is provided as a covering of a driver airbag (not illustrated) and which is to be mounted on a steering wheel of a vehicle according to an exemplary embodiment. The airbag cap 1 includes two parts or portions 3, 4. The first portion 3 is formed from a hard, dimensionally stable material and the second portion 4 is formed from a soft material less dimensionally stable than the first portion 3. The airbag cap 1 is arranged in a vehicle with respect to an airbag so that it covers the airbag toward the interior of the vehicle. The second portion 4 is arranged above the first portion 3 (cf. the sectional illustration of FIG. 1B) and with one side forms a side of the airbag cap 1 that points toward the vehicle interior.

The second portion 4 has a central opening region in the form of a tear or tear open region 2 that includes a plurality of tear or tear open lines 21 that tear open during the deployment of the airbag. When the tear lines 21 are torn open, an orifice in the tear region 2 is formed through which the airbag can be deployed.

Figure 1B:
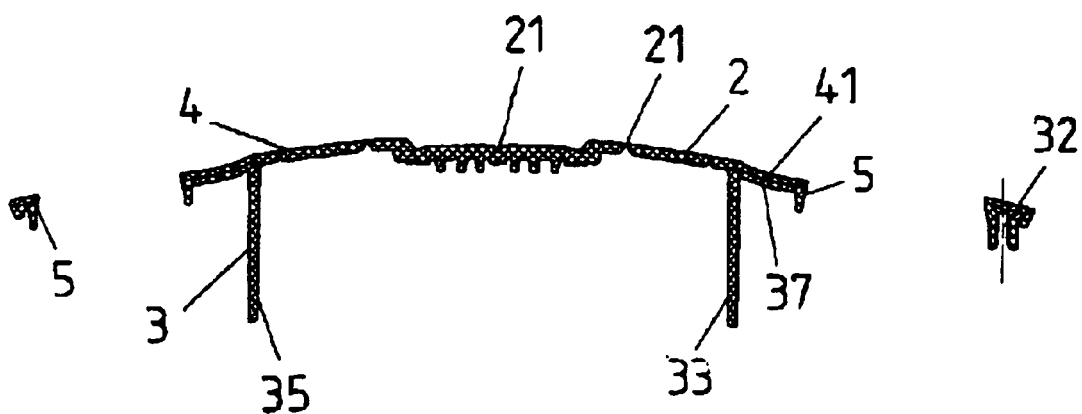
FIG. 1B is a sectional view of the airbag cover of FIG. 1A according to an exemplary embodiment.

FIG. 1B is a section view along the line A-A depicted in FIG. 1A and illustrates that the second portion 4 is arranged above the first portion 3 so the tear region 2 is located above a passage 33 formed in the first portion 3. The passage 33 is delimited by a sidewall 35 that is stabilized by transverse ribs 31. The passage 33 leads the deploying airbag to the tear region 2 of the second portion 4.

The sidewall 35 of the passage 33 (assisted by the stabilizing ribs 31) guides the deployment pressure of the airbag in the direction of the tear region 2 of the second portion 4. As a result, the pressure of the deploying airbag can act almost completely on the tear lines 21 of the tear region 2, thus making it possible for the tear region 2 to be torn open quickly and reliably.

One side of the second portion 4 facing away from the vehicle interior (in the mounted state of the airbag cap) includes a marginal portion 41. The marginal portion 41 extends and closes around the tear open region 2. The marginal portion 41 is materially integral to a surface portion 37 surrounding the passage 33 of the first portion 3. This connection may take place, in particular, so that the tear open region 2 runs tautly tensioned above the passage 33.

A taut tensioning of the tear open region 2 may avoid or reduce the likelihood of a situation where deformations occur in the second portion 4 during the deployment of the airbag, which would cause the energy of the deploying airbag to be reduced. However, the deployment energy of the airbag may be available as completely as possible for tearing open the tear region 2 so that it tears open quickly and the airbag can be deployed quickly into the vehicle interior.

The soft second portion 4 includes tear open function of the airbag cap 1 while the more dimensionally stable first portion 3 ensures the necessary rigidity of the airbag cap 1 and fastens the airbag cap 1 to a steering wheel. For fastening to a steering wheel, the first portion 3 includes threaded bores 32 as fastening structures, through which the airbag cap 1 can be screwed to a steering wheel.

The airbag cap 1 also includes circular orifices 5 that are formed by corresponding orifices, one above the other, in the first portion 3 and in the second portion 4. The orifices 5 may allow access to operating elements (not illustrated) arranged on the steering wheel.

The airbag cap 1 together with the two portions 3, 4 can be produced with a two component injection molding method. The first portion 3 may be an injection preform (cf. FIG. 2) that is formed from a dimensionally stable material while the second portion 4 may be produced as a finished injection form (cf. FIG. 3) from a soft material.

Figure 2:
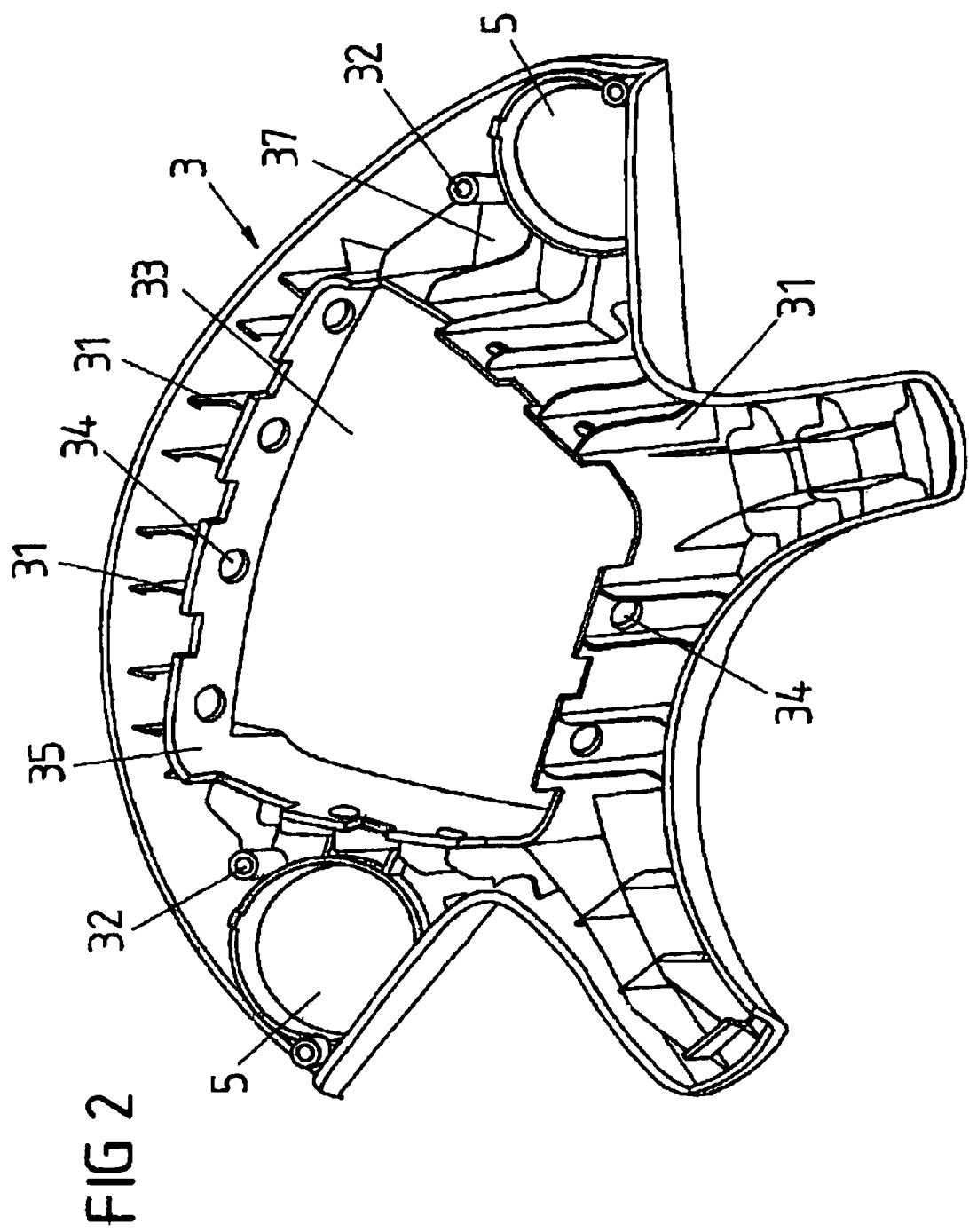
FIG. 2 is a perspective view of a first portion of an airbag cover according to an exemplary embodiment.

FIG. 2 is an enlarged illustration of an injection preform of the first portion 3 formed from a hard material for an airbag cap according to an exemplary embodiment. The injection preform 3 has a central passage 33 that in the finished airbag cap is covered by a tear region of a finished injection form formed from a soft material (cf. FIGS. 1A and 1B). When triggered, the airbag (not illustrated) is deployed through the passage 33. The passage 33 is delimited by a sidewall 35 stabilized by a rib structure 31 and forms a "duct" that guides the deploying airbag to the tear region of the airbag cap.

In addition to threaded bores 32, the injection preform 3 has fastening orifices 34 that are arranged along the central passage 33 and fasten the injection perform (and, consequently, the entire airbag cap) to a steering wheel.

FIG. 3 shows a finished injection form of the second portion 4 that is formed from a soft material and is designed to correspond with the injection preform 3 of FIG. 2 and with the perform 3 to form an airbag cap. The finished injection form 4 has a central tear region 2 that tears open along tear lines 21 as a result of the deployment pressure of an airbag.

Because the finished injection form 4 is formed from a soft material, the tear open region 2 can be tore open simply and reliably so that the airbag can be deployed as unimpeded as possible through the airbag cap (formed by the injection preform of FIG. 2 and the finished injection form of FIG. 3). In addition, the airbag cap 1 may include design elements or have a special surface feel on the side of the finished injection form 4 (not illustrated in FIG. 3) facing the vehicle interior. The design elements or special feel may be formed using an injection molding of a soft material.

The priority application, Germany Patent Application No. 20 2006 013 133.7, filed Aug. 23, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application.

What is claimed is:

1. A cover for an inflatable airbag that is configured to restrain a vehicle occupant in a motor vehicle, the airbag cover arranged to cover the airbag on a side facing a vehicle interior, the airbag cover having an opening region configured to form an orifice during deployment of the airbag so that the airbag is deployed through the orifice of the airbag cover and into the vehicle interior, wherein the cover comprises:
a first portion; and
a second portion, the first portion comprising a more dimensionally stable material than the second portion, the second portion comprising the opening region configured to tear open and form the orifice for the airbag during deployment, and the second portion being formed from a material that is softer or more flexible than the material of the first portion,
wherein the first portion comprises the orifice, the orifice being delimited by a sidewall and being covered by the opening region of the second portion, the sidewall being configured to guide the deploying airbag to the opening region, and
wherein the first and second portions are injection moldings.

2. The airbag cover as claimed in claim 1, wherein the opening region comprises at least one tear line formed by material weakening and that tears open during deployment of the airbag.

3. The airbag cover as claimed in claim 1, wherein the first portion comprises fastening structures configured for fastening the airbag cover to a vehicle part.

4. The airbag cover as claimed in claim 3, wherein the fastening structures allow a latch, screw, or rivet connection.

5. The airbag cover as claimed in claim 1, wherein the first and second portions correspond to one another and are arranged with respect to one another so that after the airbag cover is mounted in the vehicle the first portion faces away from the vehicle interior and the second portion faces the vehicle interior.

6. The airbag cover as claimed in claim 1, wherein the first portion comprises rib structures that extend transversely with respect to the sidewall and are configured to stabilize the sidewall of the orifice.

7. The airbag cover as claimed in claim 1, wherein a first side of the second portion forms an outside surface of the airbag cover that points toward the vehicle interior after the airbag cover is mounted.

8. The airbag cover as claimed in claim 7, wherein the second portion comprises a closed marginal portion surrounding the opening region and the first portion comprises a closed surface portion surrounding the orifice, and wherein a side of the closed marginal portion facing away from an exterior is connected to the closed surface portion.

9. The airbag cover as claimed in claim 1, wherein the first and second portions are materially integral to one another.

10. The airbag cover as claimed in claim 1, wherein the first portion comprises a harder material than the second portion.

11. The airbag cover as claimed in claim 1, wherein the first and second portions comprise a plastic material.

12. The airbag cover as claimed in claim 11, wherein the plastic material of the first portion belongs to the same family of plastics as the plastic material of the second portion.

13. A cover for an inflatable airbag that is configured to restrain a vehicle occupant in a motor vehicle, the airbag cover arranged to cover the airbag on a side facing a vehicle interior, the airbag cover having an opening region configured to form an orifice during deployment of the airbag so that the airbag is deployed through the orifice of the airbag cover and into the vehicle interior, wherein the cover comprises:
- a first portion; and
- a second portion, the first portion comprising a more dimensionally stable material than the second portion, the second portion comprising the opening region configured to tear open and form the orifice for the airbag during deployment, and the second portion being formed from a material that is softer or more flexible than the material of the first portion,
- wherein the first portion comprises the orifice, the orifice being delimited by a sidewall and being covered by the opening region of the second portion, the sidewall being configured to guide the deploying airbag to the opening region, and
- wherein the first portion comprises rib structures that extend transversely with respect to the sidewall and are configured to stabilize the sidewall of the orifice.

14. An airbag module for a vehicle occupant restraint system, comprising:
- a gas generator;
- an airbag; and
- a cover, wherein the cover is arranged to cover the airbag on a side facing a vehicle interior, the airbag cover having an opening region configured to form an orifice during deployment of the airbag so that the airbag is deployed through the orifice of the cover and into the vehicle interior, wherein the cover comprises:
  - a first portion; and
  - a second portion, the first portion comprising a more dimensionally stable material than the second portion, the second portion comprising the opening region configured to tear open and form the orifice for the airbag during deployment, and the second portion being formed from a material that is softer or more flexible than the material of the first portion,
- wherein the first portion comprises the orifice, the orifice being delimited by a sidewall and being covered by the opening region of the second portion, the sidewall being configured to guide the deploying airbag to the opening region, and
- wherein the first and second portions are injection moldings.

15. The airbag module as claimed in claim 14, wherein the airbag module is a driver airbag module.

16. The airbag module as claimed in claim 14, wherein the airbag module is configured to be arranged in a the steering wheel of the vehicle.

17. The airbag cover as claimed in claim 13, wherein the airbag cover is a two component injection molding, one of the two components of the injection molding forming the first portion and the other of the two components forming the second portion.

* * * * *